Patented Feb. 2, 1926.

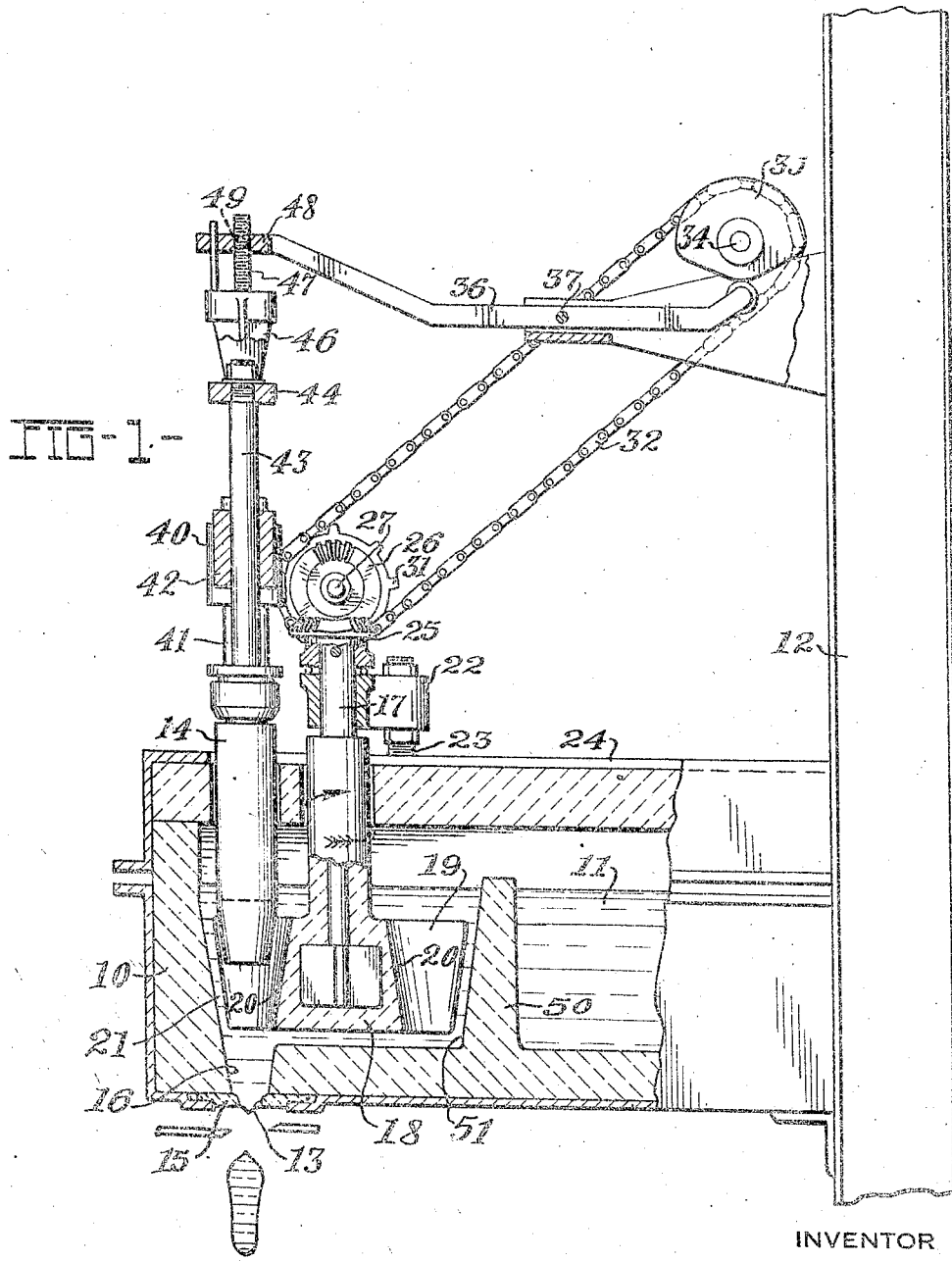

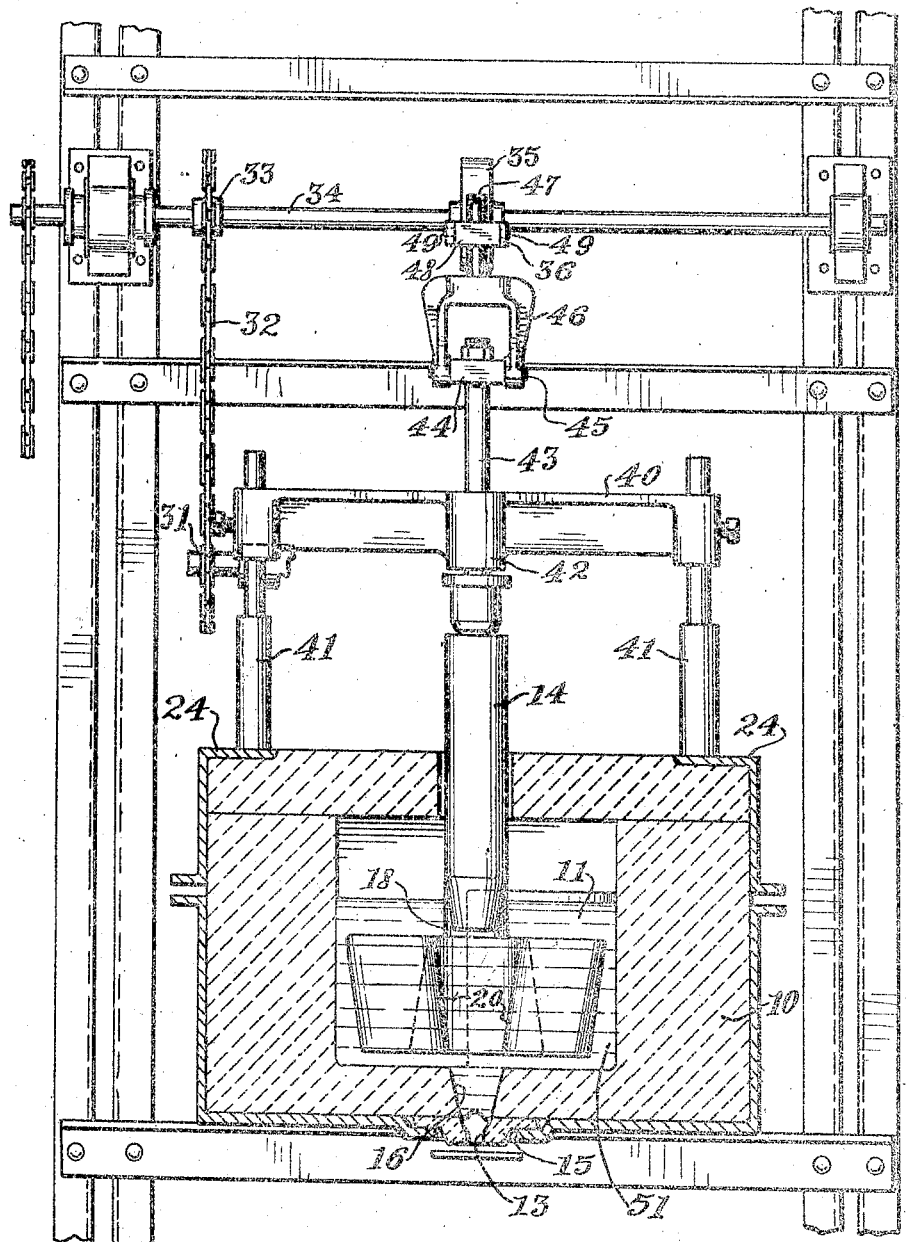

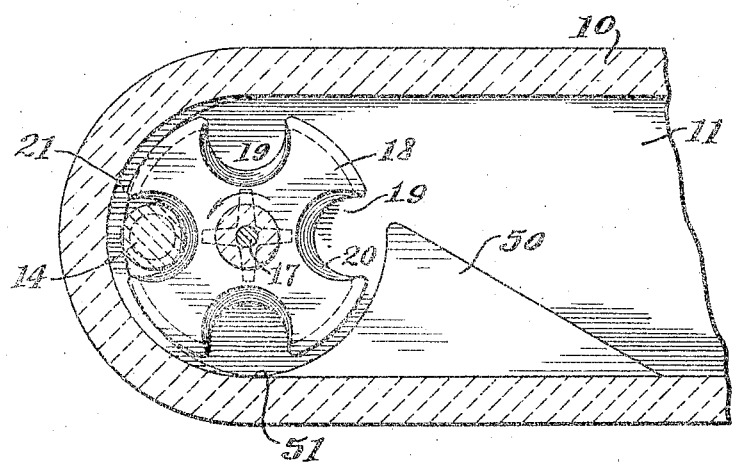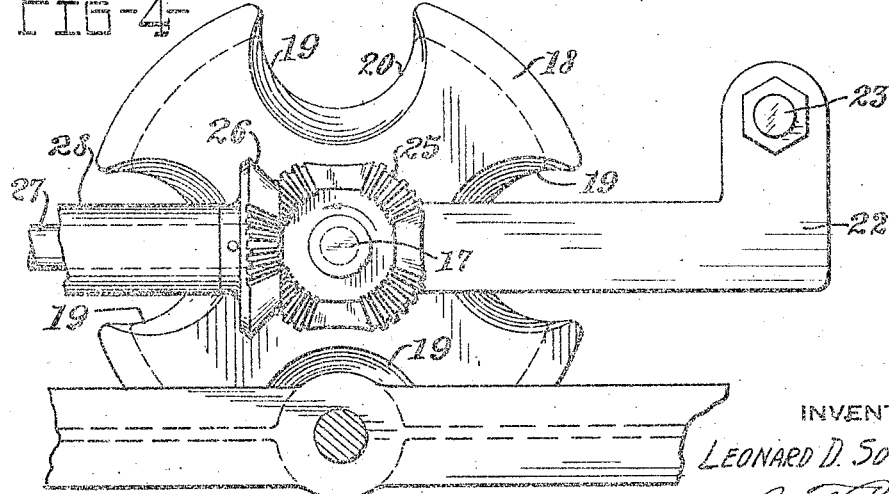

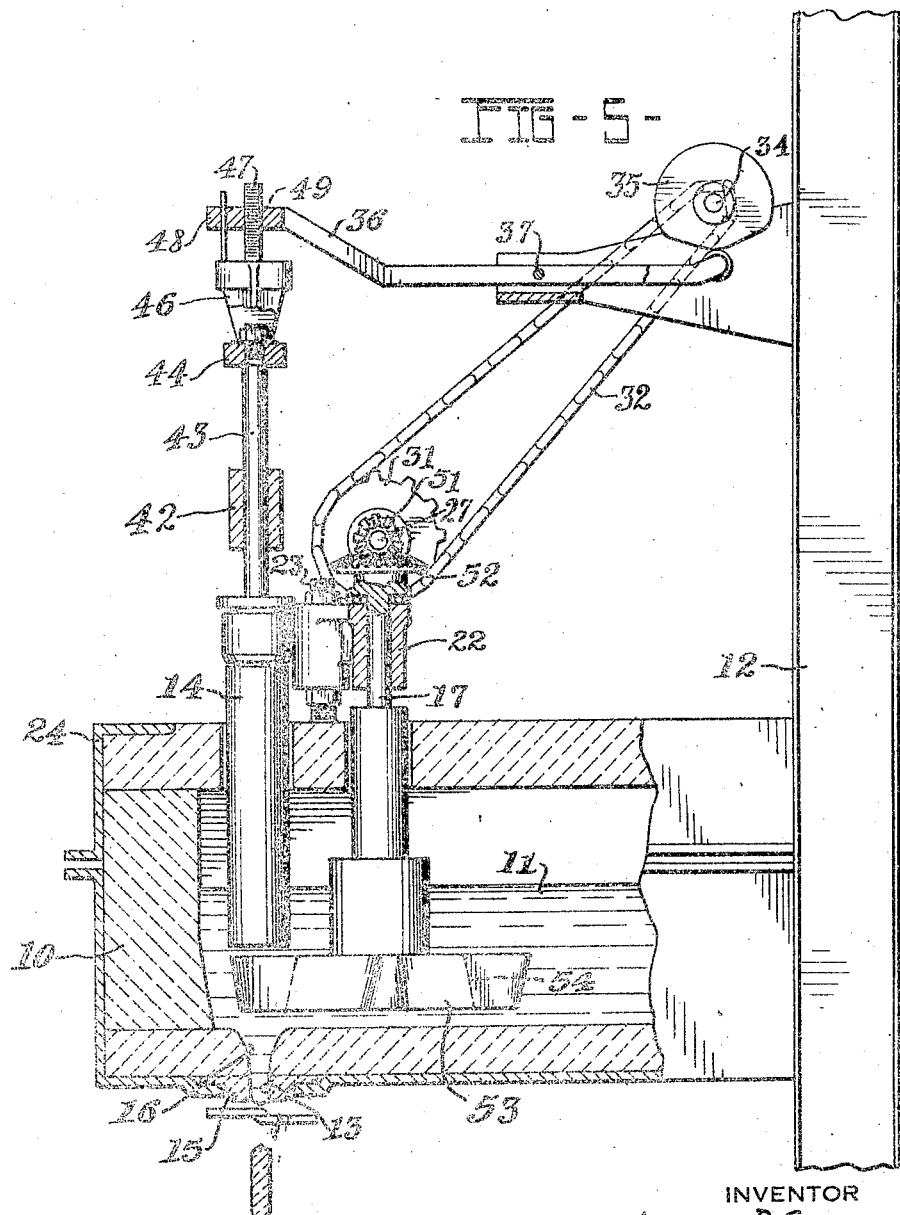

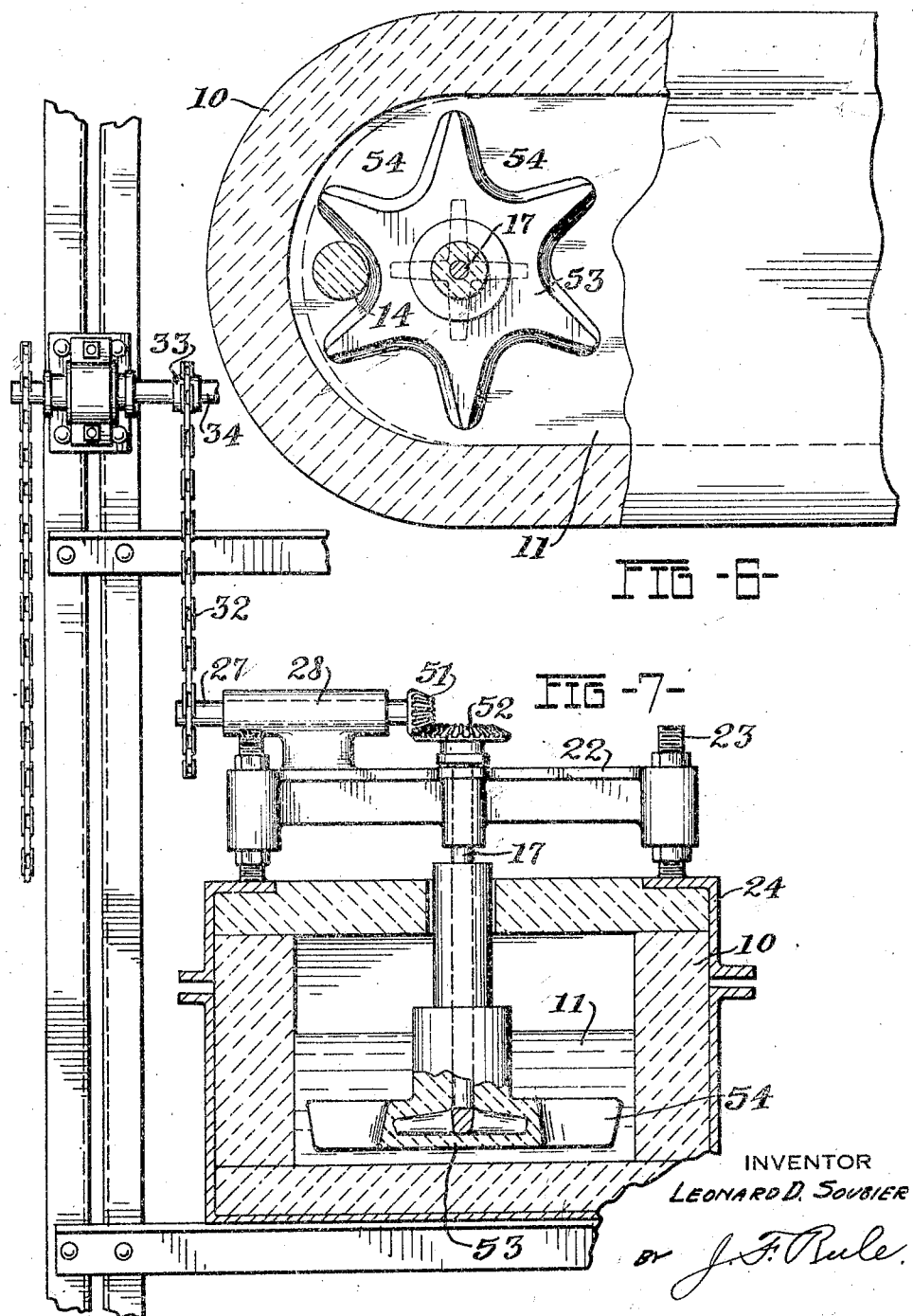

1,571,215

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed August 27, 1923. Serial No. 659,452.

*To all whom it may concern:*

Be it known that I, LEONARD D. SOUBIER, a citizen of the United States, residing at Toledo, in the county of Lucas and State of Ohio, have invented new and useful Improvements in Glass Feeders, of which the following is a specification.

My invention relates to apparatus for feeding charges of molten glass and particularly to a glass feeder of the type in which the glass is discharged through an outlet opening in the bottom of a container, the discharge being regulated and controlled by means of a periodically reciprocated regulating plug projecting into the glass above the outlet.

In feeders of this type, the outlet opening is usually disposed in the floor of a furnace boot or extension, adjacent the forward end of the boot, and the regulating plug is reciprocated in the main body of glass in the boot and in line with the outlet opening.

An object of the present invention is to provide means for segregating or separating from the main body of glass in the container, a reduced quantity of glass commensurate with the volume of the charge to be delivered through the outlet, so that the effect of the regulating plug on the issuing glass is more pronounced in both directions of its movement. This gives a better control of both the shape and size of the issuing gob of glass than is obtained with the usual arrangement above mentioned.

A further object of the invention is to provide suitable means for positively controlling and directing the glass in its passage from the main furnace to a position in register with the outlet opening in the floor of the boot.

A further object is the provision of a practical construction for carrying out the ideas herein embodied.

Further objects will appear hereinafter.

In the accompanying drawings:

Figure 1 is a sectional side elevation of apparatus constructed in accordance with my invention.

Fig. 2 is a front elevation of said apparatus with part of the front wall broken away.

Figure 3 is a fragmentary elevation showing the glass-carrying member.

Figure 4 is an elevation showing the driving gears for said glass-carrying member.

Figure 5 is a sectional elevation of a modification.

Figure 6 is a part sectional plan of the same.

Figure 7 is a front sectional elevation of said modification.

A furnace boot or extension 10 (Fig. 1) is continuously supplied with molten glass 11 from a furnace 12. The glass issues periodically through an outlet opening 13 in the floor of the boot, the discharge being regulated by an implement herein shown as a clay plunger or regulator 14 which projects vertically downward into the glass and is periodically reciprocated vertically.

The plunger during its upward movement operates to retard or reverse the flow through the outlet, and during its downward movement serves as an impeller to exert an expelling action on the glass.

The opening 13, as shown, is formed in a clay bushing 15 above which is a funnel shaped opening or well 16 formed in the floor of the boot 10.

Mounted on a vertically disposed shaft 17 and projecting downward into the glass, is a glass-conveying member 18 (Fig. 3) constructed of refractory material and having formed therein a series of pockets 19. The walls 20 of these pockets are tapered so as to form with the well 16 and the front wall 21 of the boot, a funnel shaped discharge chamber, when one of said pockets is in register with said well.

The shaft 17 is mounted for rotation in a bearing bracket 22 supported by vertical standards 23 projecting from the boot casing 24. Attached to the upper end of the shaft 17 is an intermittent bevel gear 25 running in mesh with an intermittent gear 26 mounted on a shaft 27, said shaft mounted in a bearing 28 on the bracket 22. Attached to the opposite end of the shaft 27 is a sprocket 31 connected by a drive chain 32 to a driving sprocket 33 on a drive shaft 34. Also mounted on the shaft 34 is a plunger-operating cam 35 which operates through a lever 36 fulcrumed at 37 to reciprocate the clay plunger 14 vertically.

A bearing bracket 40 (Fig. 2) supported by standards 41 of the boot casting 24, provides a bearing 42 for the stem 43 of the clay plunger. The stem 43 is mounted in a block 44 pivoted at 45 to a yoke 46, said yoke having a screw projection 47 extending upward to a pivot block 48. The pivot block 48 is pivotally connected at 49 to the lever 36. The elements above enumerated and described form a link connection between the lever 36 and the plunger 14 which allows said plunger to be reciprocated without any binding in the bearing 42. The screw 47 allows for vertical adjustment of the plunger.

Referring to Figures 1 and 4, it will be noted that for each complete rotation of the cam 35, the bevel gear 26 will also make one complete rotation, and thereby rotate the gear 25 through 90°. Thus, the plunger 14 will make one complete reciprocation each time a pocket 19 is brought into register with the well 16.

Projecting outward from the wall 10 of the boot is a guard 50 (Fig. 3) having an arc-shaped front wall which, with the semi-circular front wall of the boot, forms a substantially circular chamber 51 in which the carrier 18 is rotated. The purpose of this guard is to prevent the pockets 19 of the carrier after they are discharged at the outlet 13 from filling with glass, until they have passed beyond the guard, thereby directing and controlling the main current or path of the glass and bringing it in line with the movement of the pockets toward the outlet 13.

In operation, the regulator 14 is periodically reciprocated vertically. When the regulator has just reached its uppermost position, the carrier 18 is rotated so as to bring a pocket 19 into alignment with the outlet 13, thereby forming with the well 16 a funnel shaped chamber into which the regulator is projected. The down stroke of the regulator displaces a quantity of glass, the amount depending upon the length of stroke and size of plunger. Owing to the fact that the discharge chamber is funnel shaped and so arranged as to shut off or isolate a quantity of glass from the main body of glass, the expelling and retarding effect of the regulator upon the glass is considerably enhanced.

Figures 5, 6 and 7 show a modification wherein the carrier is operated continuously. The driving mechanism for this is the same up to the shaft 27 where the intermittent gearing is replaced by gears 51 and 52 on the shafts 27 and 17 respectively. The carrier 53 on the shaft 17 is formed with pockets 54 therein, arranged to carry the glass to the outlet 13 in the boot floor. It will be found that as the carrier rotates bringing a new pocket into discharging position, when the projecting part of the carrier passes over the outlet 13, the glass therein will be retarded, due to the pull of the carrier upon the glass. Further, it may be noted that as the regulator 14 completes its down stroke, the movement of the carrier will assist in expelling glass and then abruptly cut off the supply. From the above, it may be seen that results are obtained with this modification similar to those obtained in the preferred form of this invention.

Modifications may be resorted to within the spirit and scope of my invention.

What I claim is:

1. The combination of a container for molten glass formed with a well in the floor thereof and provided with an outlet opening at the bottom of the well, a vertically reciprocating implement arranged to be projected downward into the glass in line with said opening, and means operable to carry segregated quantities of glass successively into register with said opening.

2. The combination of a container for molten glass having an outlet opening in the floor thereof, a vertically reciprocating plunger in line with said opening, and means operable to successively register measured quantities of glass with said outlet opening, said means comprising a horizontally rotatable member having a series of pockets formed therein.

3. In a glass feeding device, the combination of a container for molten glass having a well in the floor thereof provided with an outlet opening in its bottom, means cooperating intermittently with said well to form a discharge chamber, a plunger, and means to periodically reciprocate the plunger in the discharge chamber to discharge the glass from said chamber.

4. In a glass feeding device, the combination of a container for molten glass having a well in the floor thereof provided with an outlet opening in the bottom of the well, a glass-carrying member, said member having formed therein a series of pockets, means to rotate said member and cause said pockets to register with the well in said container and thereby form with the well a discharge chamber, and means to control the discharge of the glass from said chamber.

5. In a glass feeding device, the combination of a container for molten glass provided with an outlet opening in the floor thereof, a series of glass-carrying pockets traveling in a closed path within the body of glass in said container, and means to successively register said pockets with the said outlet opening.

6. In a glass feeding device, the combination of a container for molten glass provided with an outlet opening in the floor thereof, a series of glass-carrying pockets traveling in a closed path within the body of glass in said container, means to successively register said pockets with said outlet opening, and means to discharge the glass from the pockets.

7. In a glass feeding device, the combination of a container for molten glass provided with an outlet opening in the floor thereof, a vertically disposed plunger, an open ended glass-carrying member within the glass in said container, means to periodically move said member into register with said outlet opening, and means to reciprocate the plunger within the glass-carrying member.

8. In glass feeding apparatus, the combination of a container for molten glass provided with a discharge outlet, a measuring device within the glass in the container, automatic means for periodically moving the measuring device into cooperative relation to the outlet, an implement to control the discharge of glass, and means for periodically actuating said implement within said measuring device in synchronism with the movements of said device.

9. In glass feeding apparatus, the combination of a container for molten glass provided with a discharge outlet, a measuring device within the glass in the container, automatic means for periodically moving the measuring device into cooperative relation to the outlet, a plunger associated with the measuring device, and means for periodically reciprocating the plunger and thereby expelling the glass from the measuring device through said outlet.

Signed at Toledo, in the county of Lucas and State of Ohio, this 24th day of August, 1923.

LEONARD D. SOUBIER.